United States Patent
Chelladurai et al.

(10) Patent No.: US 6,968,010 B2
(45) Date of Patent: Nov. 22, 2005

(54) METHOD FOR EFFICIENT LOW POWER MOTION ESTIMATION OF A VIDEO FRAME SEQUENCE

(75) Inventors: Paul Sathya Chelladurai, Bangalore (IN); Arshad Ahmed, Bangalore (IN); Soumitra Kumar Nandy, Bangalore (IN)

(73) Assignee: STMicroelectronics Ltd., Uttar Pradesh (IN)

( * ) Notice: Subject to any disclaimer, the term of this patent is extended or adjusted under 35 U.S.C. 154(b) by 691 days.

(21) Appl. No.: 10/134,662

(22) Filed: Apr. 29, 2002

(65) Prior Publication Data

US 2003/0012282 A1 Jan. 16, 2003

(30) Foreign Application Priority Data

Apr. 30, 2001 (IN) ........................................ 538/DEL/01

(51) Int. Cl.$^7$ ........................... H04N 7/12; H04N 11/04; H04N 11/20
(52) U.S. Cl. ............................... 375/240.16; 375/240.22
(58) Field of Search ....................... 375/240.12, 240.16, 375/240.22; 382/240, 236

(56) References Cited

U.S. PATENT DOCUMENTS

| | | | | |
|---|---|---|---|---|
| 5,742,710 A | * | 4/1998 | Hsu et al. | 382/236 |
| 6,560,371 B1 | * | 5/2003 | Zhang et al. | 382/240 |
| 6,594,313 B1 | * | 7/2003 | Hazra et al. | 375/240.16 |
| 2003/0031253 A1 | * | 2/2003 | Itokawa | 375/240.08 |

OTHER PUBLICATIONS

New Fast Binary Pyramid Motion Estimation for MPEG2 and HDTV Encoding, Xudong Song et al, Written Jul. 1999, Published in IEEE Transactions on circuits and systems for video technology vol. 10 No. 7, Oct. 2000 Pges 1015–1028.*

* cited by examiner

*Primary Examiner*—Chris Kelley
*Assistant Examiner*—Charles Parsons
(74) *Attorney, Agent, or Firm*—Lisa K. Jorgenson; Allen, Dyer, Doppelt, Milbrath & Gilchrist, P.A.

(57) ABSTRACT

A method for efficient low power motion estimation of a digital video image is provided in which processing requirements are reduced based upon the content being processed. The method performs motion estimation of a current video image using a search window of a previous video image. The method may include forming mean pyramids of a reference macroblock and the search area and a full search at a lowest resolution. A number of candidate motion vectors (CMVs) propagated to lower levels may be dependent on a quantized average deviation estimate (QADE) of a current macroblock and the maximum distortion band obtained during training for that QADE value at that particular level. Training over a sequence may be triggered at the beginning of every sequence. This training technique may be used to determine the value of the maximum distortion band for all QADEs of the macroblocks occurring over the training frames.

31 Claims, 3 Drawing Sheets

METHOD FOR EFFICIENT LOW POWER MOTION ESTIMATION OF A VIDEO FRAME SEQUENCE

FIELD OF THE INVENTION

The present invention relates to the field of video data processing, and, more particularly, to an efficient low power motion estimation of a video frame sequence wherein processing requirements are reduced. For example, the invention is suitable for use in low bit rate coding of compressed digital video images such as in coders using the H.263 source-coding model. Specifically, the present invention provides a method for adapting the computational complexity involved in the motion estimation operation which is required for generating the motion vectors used in video coding.

BACKGROUND OF THE INVENTION

The presence of multimedia capabilities on mobile terminals opens up a spectrum of applications, such as videoconferencing, video telephony, security monitoring, information broadcast and other such services. Video compression techniques enable the efficient transmission of digital video signals. Video compression algorithms take advantage of spatial correlation among adjacent pixels to derive a more efficient representation of the important information in a video signal.

The most powerful compression systems not only take advantage of spatial correlation, but can also utilize temporal correlations among adjacent frames to further boost the compression ratio. In such systems, differential encoding is used to transmit only the difference between an actual frame and a prediction of the actual frame. The prediction is based on information derived from a previous frame of the same video sequence.

In motion compensation systems, motion vectors are derived by comparing a portion (i.e., a macroblock) of pixel data from a current frame to similar portions (i.e., search area) of the previous frame. A motion estimator determines the closest match of the reference macroblock in the present image using the pixels in the previous image. The criterion used to evaluate similarity is usually the mean absolute difference between the reference macroblock and the pixels in the search area corresponding to that search position. The use of motion vectors is very effective in reducing the amount of data to be transmitted.

The MPEG-4 simple profile which is intended for wireless video applications is representative of the current level of technology in low-bit rate, error resilient video coding. From the viewpoint of system design, all the proposed techniques have to be implemented in the highly power constrained, battery operated environment. Hence, to prolong battery life, system and algorithm parameters are preferably modified based upon the data being processed.

The source coding model of MPEG-4 simple profile (which is based in the H.263 standard) employs block-based motion compensation for exploiting temporal redundancy and discrete cosine transform for exploiting spatial redundancy. The motion estimation process is computationally intensive and accounts for a large percentage of the total encoding computations. Hence there is a need for developing methods that accurately compute the motion vectors in a computationally efficient manner.

The fixed size block-matching (FSBM) technique for determining the motion vectors is the most computationally intensive technique among all known techniques, but it gives the best results as it evaluates all the possible search positions in the given search region. Techniques based on the unimodal error surface assumption, such as the N-step search and logarithmic search achieve a large fixed magnitude of computational reduction irrespective of the contents being processed. But, the drop in peak signal noise ratio (PSNR) due to local minima problems leads to perceptible difference in visual quality, especially for high activity sequences.

The multi-resolution motion estimation technique of finding the motion vectors is a computationally efficient technique compared to the FSBM algorithm. In this technique, coarse values of motion vectors are obtained by performing the motion vector search on a low-resolution representation of the reference macroblock and the search area. This estimate is progressively refined at higher resolutions by searching within a small area around these coarse motion vectors (also referred to as candidate motion vectors, or CMVs) obtained from the higher level.

The number of candidate motion vectors propagated to the higher resolution images is usually fixed by the algorithm designer to be a single number, irrespective of the sequence or the macroblock characteristics. Each CMV contributes to a determinate number of computations. Hence, by using a prefixed number of CMVs, either the PSNR obtained may be low if a small number of CMVs are propagated or the computational complexity becomes large if many CMVs are propagated. In a power constrained environment, propagating many CMVs would reduce battery life. Hence, fixed solutions for multi-resolution motion estimation either have a high power requirement if PSNR is to be maintained or may result in poor image quality when a fixed low computational complexity technique is used.

SUMMARY OF THE INVENTION

An object of the present invention is to provide an efficient low power motion estimation of a video frame sequence in which processing requirements are minimized while maintaining picture quality at desired levels.

Another object of the present invention is to provide a system and method of scaling computations in the technique of multi-resolution mean pyramid that is based upon the video content being processed.

Still another object of the present invention to provide a system and method for reducing the computations required in determining the motion vectors associated with reference macroblocks having low frequency content over the macroblock.

To achieve the above objects the present invention provides a method for minimizing computations required for compression of motion video frame sequences using multi-resolution level mean pyramid technique while maintaining at least a predetermined picture quality level. This is done by dynamically adjusting the number of CMVs propagated to each higher resolution level.

More particularly, the method may include establishing a relationship between quantized values of frequency content of the reference macroblocks in the video frames against distortion levels resulting from the mean pyramid averaging process, determining the frequency content of each macroblock, and predicting the distortion resulting from mean pyramid generation over the frequency content using the relationship. The method may further include computing the limiting mean absolute difference (MAD) value for maintaining picture quality using the predicted distortion value, and propagating those CMVs whose MAD value falls below the limiting MAD value.

The relationship may be established using a training sequence of video frames including generating mean pyramids on the reference blocks and on the corresponding search area at each level, generating deviation pyramids for the reference block by computing the mean deviation of each pixel at a given level from corresponding pixels at the lower level, and computing the average deviation estimate (ADE) at each resolution level by averaging the deviation pyramid values at that level. Moreover, the ADE value may be quantized to determine quantized ADE (QADE) for the corresponding reference block, and corresponding MAD may be computed for all search positions at a lowest resolution level.

Establishing the relationship may also include propagating the maximum allowed number of CMVs corresponding to the lowest MAD values to a next higher resolution level, computing MAD values at search positions around the CMV positions obtained from lower resolution level, and identifying those search positions in each level that correspond to the least MAD obtained at the highest resolution level as the final motion vector position for that level and the corresponding MAD value as the $MAD_{corr}$ for that level. Further, distortion may be computed as the difference between $MAD_{corr}$ and $MAD_{min}$ at each level, and the maximum of the distortion values obtained at each level over all training frames corresponding to each QADE value in a look-up table may be saved.

The frequency contents may be determined by computing quantized average deviation estimate (QADE) for each macroblock in the video frame. The distortion level may be predicted by extracting the estimated distortion value corresponding to the frequency content using the relationship established during training.

The limiting MAD for each level may be equal to the minimum computed MAD at that level incremented by the predicted distortion value. The training sequence may be re-triggered whenever the frame average MAD variation (FAMV) over the sequence exceeds a predetermined threshold value over a few frames, where the FAMV is the difference between the frame average MAD (FAM) value for the current frame and the delayed-N-frame average MAD value (DNFAM) for the previous N frames. Further, FAM may be the average of the averaged MAD values for all the reference macroblocks in a frame, and DNFAM may be the average of the FAM values for the previous N frames.

The QADE may be a value obtained after quantizing the average of the mean deviation of the mean pyramid values from the original pixel values, over the reference macroblock. The estimated distortion value may be obtained from a look-up table that matches QADE values to predicted distortion values.

The invention further relates to a system for minimizing computations required for compression of motion video frame sequences using a multi-resolution mean pyramid technique while maintaining at least a predetermined picture quality level by dynamically adjusting the number of CMVs propagated to each higher resolution level. The system may include means or circuitry for establishing a relationship between quantized values of frequency content of the reference macroblocks in the video frames against distortion levels resulting from the mean pyramid averaging process, means or circuitry for determining the frequency content of each macroblock, and means or circuitry for predicting the distortion resulting from mean pyramid generation over the frequency content using the relationship. The system may also include means or circuitry for computing the limiting MAD value for maintaining picture quality using the predicted distortion value, and means or circuitry for propagating those motion vectors whose MAD value falls below the limiting MAD value.

The relationship may be established using a training sequence of video frames. To this end, the system may further include means or circuitry for generating mean pyramids on the reference blocks and on the corresponding search area at each level, means or circuitry for generating deviation pyramids for the reference block by computing the mean deviation of each pixel at a given level from corresponding pixels at the lower level, and means or circuitry for computing the average deviation estimate (ADE) at each resolution level by averaging the deviation pyramid values at that level. The system may further include means or circuitry for quantizing the ADE value as to determine quantized ADE (QADE) for the corresponding reference block, means or circuitry for computing corresponding MAD for all search positions at a lowest resolution level, means or circuitry for propagating the maximum allowed number of CMVs corresponding to the lowest MAD values to next higher resolution level, and means or circuitry for computing MAD values at search positions around the CMV positions obtained from a lower resolution level.

Moreover, the system may further include means or circuitry for identifying those search positions in each level that correspond to the least MAD obtained at the highest resolution level as the final motion vector position for that level and the corresponding MAD value as the $MAD_{corr}$ for that level, and means or circuitry for computing distortion as the difference between $MAD_{corr}$ and $MAD_{min}$ at each level. Means or circuitry for saving the maximum of the distortion values obtained at each level over all training frames corresponding to each QADE value in a look-up table may also be included.

The frequency contents may be determined by means or circuitry for computing QADE for each macroblock in the video frame. The distortion level may be predicted by means or circuitry for extracting the estimated distortion value corresponding to the frequency content using the relationship. The limiting MAD value for each level may be obtained by means or circuitry for incrementing the minimum computed MAD at that level by the predicted distortion value.

In addition, the training sequence may be re-triggered whenever the frame average MAD variation (FAMV) over the sequence exceeds a predetermined threshold value over a few frames, the FAMV being determined by means or circuitry for computing the difference between the frame average MAD (FAM) value for the current frame and the delayed-N-frame average MAD value (DNFAM) for the previous N frames, where FAM is the average of the averaged MAD values for all the reference macroblocks in a frame, and DNFAM is the average of the FAM values for the previous N frames.

The QADE may be a value obtained using means or circuitry for quantizing the average of the mean deviation of the mean pyramid values from the original pixel values over the reference macroblock. The estimated distortion value may be obtained by a look-up table that matches QADE values to predicted distortion values.

The present invention also provides a computer readable medium comprising computer readable program code stored on a computer readable storage medium embodied therein for minimizing computations required for compression of motion video frame sequences a using multi-resolution level mean pyramid technique while maintaining at least a predetermined picture quality level. This may be done by dynamically adjusting the number of CMVs propagated to each higher resolution level.

The computer readable medium may include computer readable program code for implementing the steps of establishing a relationship between quantized values of frequency content of the reference macroblocks in the video frames against distortion levels resulting from the mean pyramid averaging process, determining the frequency content of each macroblock, and predicting the distortion resulting from mean pyramid generation over the frequency content using the relationship. Further, the code may be for implementing the steps of computing the limiting MAD value for maintaining picture quality using the predicted distortion value, and propagating those motion vectors whose MAD value falls below the limiting MAD value.

The relationship is established using a training sequence of video frames, for which the program code may implement the steps of generating mean pyramids on the reference blocks and on the corresponding search area at each level, generating deviation pyramids for the reference block by computing the mean deviation of each pixel at a given level from corresponding pixels at the lower level, computing the average deviation estimate (ADE) at each resolution level by averaging the deviation pyramid values at that level, and quantizing the ADE value to determine quantized ADE (QADE) for the corresponding reference block. Moreover, a corresponding MAD may be computed for all search positions at a lowest resolution level, the maximum allowed number of candidate motion vectors (CMVs) corresponding to the lowest MAD values to next higher resolution level may be propagated, and MAD values computed at search positions around the CMV positions obtained from lower resolution level.

Additional relationship establishing steps implemented by the program code may include identifying those search positions in each level that correspond to the least MAD obtained at the highest resolution level as the final motion vector position for that level and the corresponding MAD value as the $MAD_{corr}$ for that level, and computing distortion as the difference between $MAD_{corr}$ and $MAD_{min}$ at each level. Additionally, the maximum of the distortion values obtained at each level over all training frames corresponding to each QADE value in a look-up table may be saved.

The frequency content may be determined by computing quantized average deviation estimate (QADE) for each macroblock in the video frame. The distortion level may be predicted by extracting the estimated distortion value corresponding to the frequency content using the relationship. Further, the limiting MAD value for each level may be obtained by incrementing the minimum computed MAD at that level by the predicted distortion value.

The training sequence may be re-triggered whenever the frame average MAD variation (FAMV) over the sequence exceeds a predetermined threshold value over a few frames. The FAMV may be determined by the computer readable program code means for computing the difference between the frame average MAD (FAM) value for the current frame and the delayed-N-frame average MAD value (DNFAM) for the previous N frames, where FAM is the average of the averaged MAD values for all the reference macroblocks in a frame and DNFAM is the average of the FAM values for the previous N frames.

The QADE may be a value obtained by quantizing the average of the mean deviation of the mean pyramid values from the original pixel values over the reference macroblock. The estimated distortion value may be obtained by reading from a look-up table that matches QADE values to predicted distortion values.

DETAILED DESCRIPTION OF THE PREFERRED EMBODIMENTS

Figure 1:
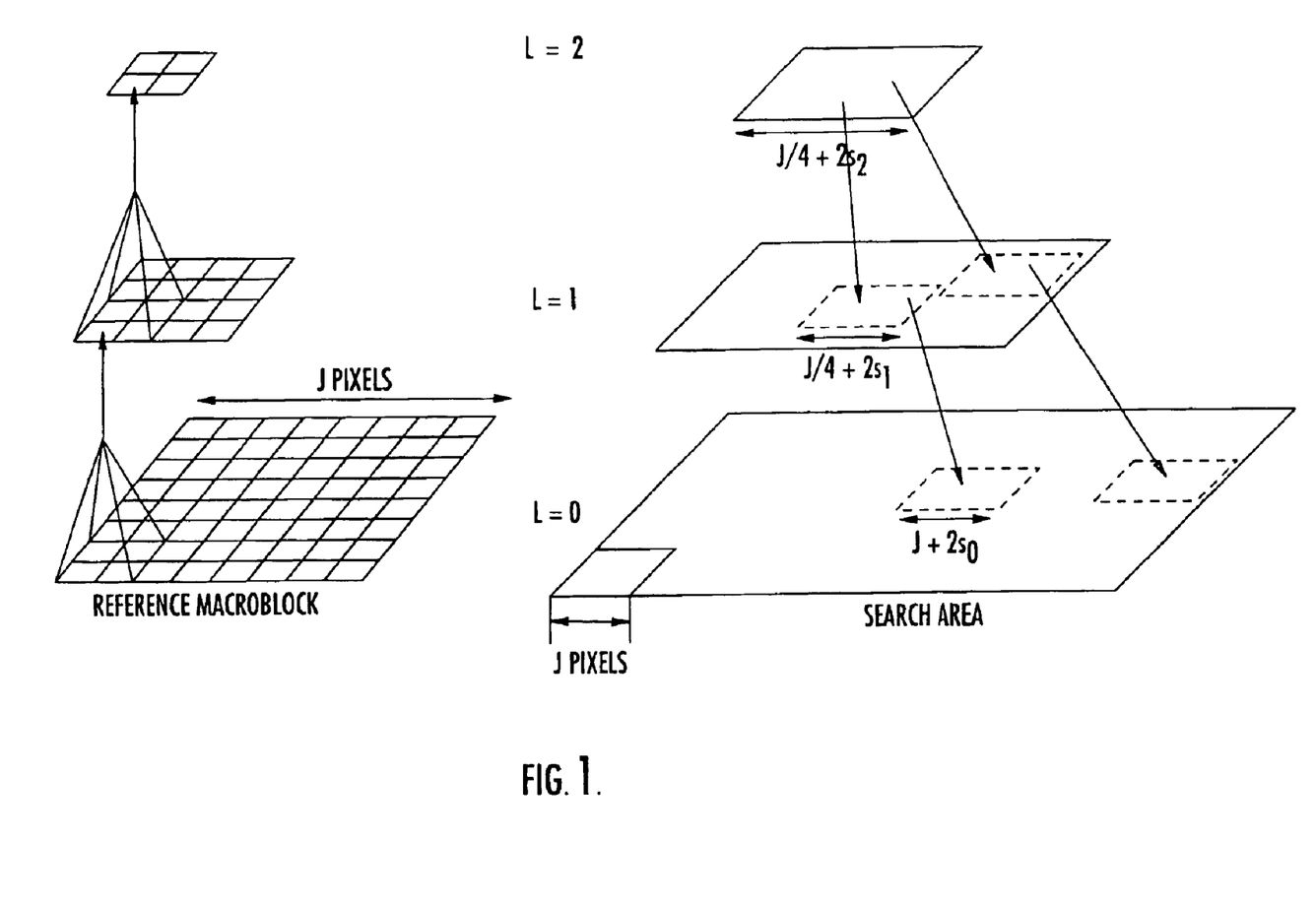
FIG. 1 is a schematic diagram illustrating the mean pyramid generation process for the reference macroblock and the process of performing the multi-resolution motion estimation in accordance with the present invention.

A diagrammatic view of the process of generating the mean pyramid is illustratively shown in FIG. 1. In equation form:

$$x_L^k(p_1q) = \left[\frac{1}{4}\sum_{u=-1}^{0}\sum_{u=-1}^{0} x_{L-1}^k(2p + u_12q + u)\right] \quad (1)$$

$$1 \leq L \leq 2, 1 \leq p \leq \frac{N_H}{2^L}, 1 \leq q \leq \frac{N_V}{2^L}$$

where L denotes the pyramid level, k denotes the frame number, p and q are pixel positions, and N_H and N_V denote the horizontal and vertical frame size respectively. Mean absolute difference (MAD) of pixel values is used as a measure to determine the motion vectors (MV) at each level L and is given by:

$$MAD_{M,n}^{L,k}(i,j) = \frac{1}{IJ}\sum_{i=j}^{i+I-1}\sum_{j=j}^{j+J-1} |x_L^k(i,j) - x_L^{k-1}(i+m, j+n)| \quad (2)$$

$$I = I/2^L, J = J/2^k, -s_L \leq m, n \leq s_L$$

$$MV_L^k(i,j) = \arg_{-d=\leq m,n\leq d=}\min MAD_{m,n}^{L,k}(i,j) \quad (3)$$

where m,n denote the search coordinates for the macroblock at the position (i,j), s_L is the level dependent search range, and I, J denote the macroblock height and width respectively.

FSBM is performed at the highest level of the mean pyramid to detect random motion and obtain a low-cost estimate of the motion associated with the macroblock. This estimate is progressively refined at lower levels by searching within a small area around the motion vector obtained from the higher level. This process is shown in FIG. 1 where 2 CMVs are propagated from every level to the next lower level. In equation form, $$MV_L^k(i,j) = 2MV_{L+1}^k(i,j) + \delta MV_L^k(i,j) \quad (4)$$

Since we determine the number of CMVs to be propagated based on the frequency content in the reference macroblock, we need to estimate this quantity. The deviation pyramid used to estimate the frequency characteristics of the macroblock being matched is defined as:

$$D_L^k(p, q) \left| \frac{1}{4} \sum_{r=-1}^{0} \sum_{o=-1}^{0} |x_{L-1}^k(2p+r, 2q+s) - x_L^k(p,q)| \right| \quad (5)$$

The deviation pyramid measures the deviation of the mean from the original pixel values. It is representative of the error introduced by the process of averaging. To obtain a single quantity representative of the frequency content of the macroblock, we sum up the deviation pyramid values generated for the reference macroblock at each level. A reference macroblock with low frequencies sums up to a small value, whereas the presence of high frequencies results in a large aggregate.

The average deviation estimate (ADE) of the macroblock at position (i,j) is given by $$ADE_L^k(i, j) = \frac{1}{IJ} \sum_{r=0}^{I-1} \sum_{o=0a}^{J-1} D_L^k(i+r, j+s) \quad (6)$$

To estimate the content complexity characteristics, we define a term called the distortion band which gives the difference between the minimum MAD found at a particular level and the MAD value corresponding to the correct motion vector position. This is given by:

$$\text{band}^L(i,j) = MAD_{corr}^L(i,j) - MAD_{min}^L(i,j) \quad (7)$$

This value, if known, can be used to determine the threshold MAD value, and all motion vectors whose MAD falls below this value can be passed to the lower level as CMVs. The distortion band value needs to be predicted, and in accordance with the present invention the distortion band value is predicted using the ADE defined above. The relationship between the distortion band value and the ADE can be non-linear for a particular video sequence, and this relation is learned during training.

The relationship between the ADE values and the distortion band is determined during the training phase as follows. During training, the maximum allowed number of CMVs are propagated between all adjacent levels, and based on the final value of the motion vector the distortion band at each of the levels can be calculated as in equation (7). The ADE axis is uniformly quantized, and the maximum value of the distortion band at each of the quantized ADE (QADE) values is stored in memory.

Figure 2:
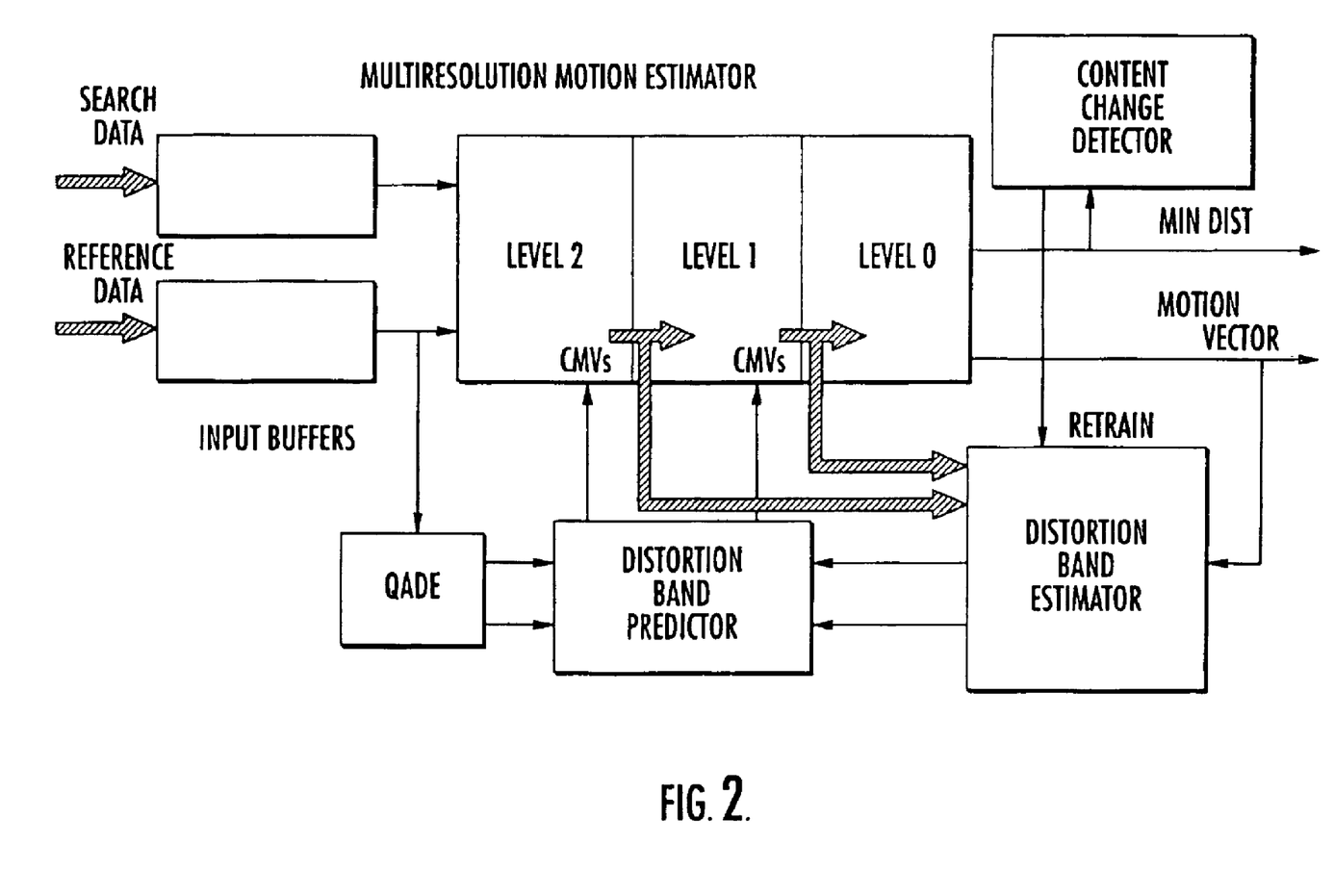
FIG. 2 is a schematic block diagram of a motion estimator in accordance with the present invention.

The schematic diagram of the proposed motion estimator is illustratively shown in FIG. 2. The functioning of each module is described below.

1) Distortion Band Estimator:

The distortion band estimator is operational during the training of the motion estimator. During the training phase, the number of CMVs passed between adjacent levels is kept at the maximum value for all macroblocks at all levels. The distortion band estimator matches the decimated value of the final motion vector with the CMVs passed between adjacent levels and hence determines the MAD of the correct solution at each level. Based on the MAD of the correct solution and the best solution at every level, the distortion band is calculated as in equation (7). During normal operation the distortion band estimator is turned off.

2) Distortion Band Predictor:

The distortion band predictor is look-up table driven. The table stores the maximum value of the distortion band corresponding to each of the QADEs at levels 1 and 2 obtained during training. During normal operation, the distortion band for the current reference macroblock is predicted based on the QADE value of the macroblock using the maximum value obtained during training corresponding to that particular QADE value at that level.

3) QADE:

For every reference macroblock, the QADE of the reference macroblock is determined both for levels 1 & 2. Determining the QADE at levels 1 and 2 involves the use of equations (5)–(6) followed by uniform quantization.

4) Content (Complexity) Change Detector:

On-line learning is performed at the beginning of every sequence. The content change detector is used to detect content complexity change within a sequence. It uses the frame average MAD (FAM), delayed N frame average MAD (DNFAM) and frame average MAD variation (FAMV), which are defined as follows:

$$FAM(l) = \frac{1}{M} \sum_i \sum_l MAD_{m-,n-}^{01}(i,j)$$

$$DNFAM(k) = \frac{1}{N} \sum_{i=k-N-D}^{k-D} FAM(l)$$

$$FAMV(k) = FAM(k) - DNFAM(k)$$

Here, M represents the number of macroblocks per frame, and (m–,n–) represent the motion vectors corresponding to the best MAD values for the macroblock at position (i,j). Re-training is initiated whenever the value of FAMV consistently crosses a preset threshold over a few frames. Delayed N frame averages are used to accurately determine local variations in FAM values. Computationally, determining FAM results in a single addition per macroblock. DNFAM and FAMV are computed once every frame. Hence, the computational overhead of this block is very low.

In simulations, the maximum number of CMVs passed is fixed at 9. Search data is reused at all levels of the search pyramid. The refinement range at levels 0 and 1 is fixed at ±1 along both axes. As a result, the search area due to 2 CMVs at levels 1 and 0 can overlap a maximum of 3 out of the 9 positions. This event is detected when either the x or y component of the two CMVs have the same value and the difference in the other component value is unity. When such a condition occurs, the search area is reduced correspondingly to one of the CMVs to eliminate the redundant computations.

To estimate the speedup factor, it is assumed that the addition operation involved in pyramid generation contributes to half the cost of the basic operation involved in MAD calculation, which involves the absolute difference operation followed by addition. Simulation results are given in Tables 1 through 3 below. All PSNR values quoted are for the Y-component of the image.

TABLE 1

Average PSNR comparisons

| Sequence | N-Step | Adaptive Pyramid | Frames/Training |
| --- | --- | --- | --- |
| Carphone | 32.24 (0.27) | 31.74 (0.04) | 380/3 |
| Foreman | 31.63 (0.48) | 31.79 (0.05) | 400/4 |
| Claire | 42.94 (0.01) | 42.94 (0.01) | 300/1 |
| MissA | 41.27 (0.07) | 41.28 (0.06) | 150/1 |
| Mother | 40.58 (0.04) | 40.57 (0.05) | 300/1 |
| Grandma | 42.57 (0.00) | 42.57 (0.00) | 300/1 |

TABLE 1-continued

Average PSNR comparisons

| Sequence | N-Step | Adaptive Pyramid | Frames/ Training |
|---|---|---|---|
| Salesman | 39.98 (0.05) | 39.99 (0.04) | 300/1 |
| Football | 23.98 (2.02) | 25.93 (0.07) | 210/3 |
| Flower | 21.88 (2.12) | 23.79 (0.14) | 150/1 |

In Table 1, the figures in parenthesis denote the PSNR drop compared to FSBM. The last column gives the total number of frames in the sequence and the number of times training is initiated for the sequence. For the fast-action sequences Football and Flower, PSNR drops drastically for an N-step search whereas the proposed algorithm maintains PSNR close to FSBM. Similar results are seen for Foreman and Carphone.

TABLE 2

Computational complexity comparisons using average CMVs and speedup factors

| | Average CMVs | | Speed up w.t.r | |
|---|---|---|---|---|
| Sequence | Level 1 | Level 0 | FSBM | n-step |
| Carphone | 3.22 | 4.14 | 22.23 | 1/1.41 |
| Foreman | 5.51 | 3.73 | 20.50 | 1/1.53 |
| Claire | 1.82 | 1.48 | 43.54 | 1.40 |
| MissA | 3.62 | 4.88 | 19.92 | 1/1.56 |
| Mother | 1.65 | 1.92 | 37.74 | 1.21 |
| Grandma | 2.43 | 2.18 | 32.79 | 1.05 |
| Salesman | 1.13 | 1.16 | 50.00 | 1.60 |
| Football | 5.25 | 4.63 | 21.70 | 1/1.48 |
| Flower | 3.37 | 3.16 | 27.53 | 1/1.16 |

Table 2 shows that the proposed algorithm scale computations depend on the complexity of the sequence. The reduction in average computations per macroblock for the FSBM and the N-step algorithm due to the macroblocks at the frame edges (which have smaller search regions) is taken into consideration while computing these speedup factors. The close PSNR match between FSBM and the proposed algorithm and the range of computational scaling validates the utility of content specific training.

Figure 3:
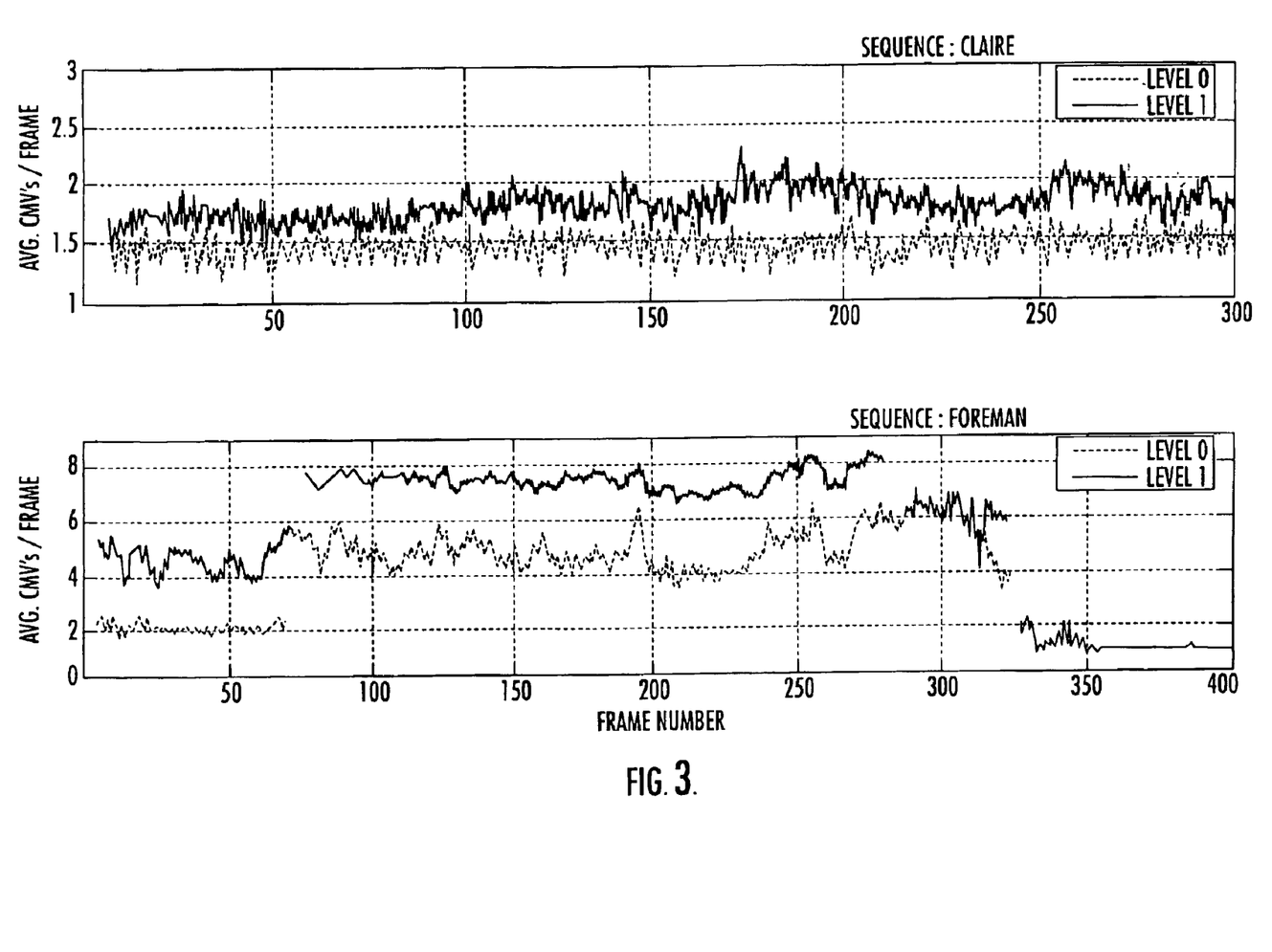
FIG. 3 includes waveform diagrams illustrating the variation of average CMVs per frame for different frames across different levels and for different sequences in accordance with the present invention.

The variation of average CMVs per frame for levels 1 and 0 for two sequences may be seen in FIG. 3. The discontinuities in the curves denote the retraining frames where 9 CMVs are passed for all macroblocks at both the levels 1 & 2. Depending on the content, there is a large variation in the average CMV value within the sequence for the Foreman sequence. The content change detector is able to determine the frame positions where content, and hence content complexity, changes significantly and thus triggers retraining.

A method for eliminating computations for sequences with plain backgrounds in accordance with the invention will now be described. Sequences with plain backgrounds generate a large number of search positions that give approximately the same MAD, and this leads to an increase in the CMVs. Solutions to this problem of plain backgrounds which have been proposed in prior art literature use a static/non-static classifier operating at the macroblock level in the FSBM framework. The drop in PSNR is highly dependent on the accuracy of the classifier that makes a static/non-static decision based on the similarity between the higher order bits of the reference macroblock pixels and the exactly overlapping position of the search area. Two solutions provided in accordance with the invention for this phenomenon are as follows.

The first solution is such that, when the QADE at both levels 1 and 2 is zero and the best MAD at level 2 is less than a threshold threshold_level2, the CMVs passed to level 1 are limited to two. When the QADE at level 1 is zero and the best MAD at level 1 is less than a threshold threshold_level1, one CMV is passed to level 0.

The second solution is similar to the first solution except that under the same conditions at level 1, the best motion vector is interpolated at level 1 to obtain the final MV position. This completely eliminates computations at level 0.

The above solutions are based on the reasoning that if the current best matches are likely to give a high PSNR and the deviation values are low, then the final best solution is unlikely to be significantly different from the best solution tracked at the current level.

TABLE 3

Speedup factors and PSNR drop with background elimination

| | Solution A | | Solution B | |
|---|---|---|---|---|
| Sequence | Speedup w.r.t. FSMB | PNSR drop | Speedup w.r.t. FSMB | SNR drop |
| Claire | 49.98 | 0.03 | 74.04 | 0.05 |
| MissA | 40.41 | 0.08 | 49.21 | 0.10 |
| Mother | 50.92 | 0.05 | 60.00 | 0.06 |
| Grandma | 51.72 | 0.02 | 62.31 | 0.03 |

As may be seen in Table 3, the speedup factor improves significantly for all sequences with plain backgrounds, with a small drop in PSNR compared to FSBM.

Those of skill in the art will therefore appreciate that numerous advantages are provided by the present invention. For example, computations for some benchmark sequences are reduced by a factor of around 70 compared to the full-search block matching motion estimation algorithm. Moreover, the reduction in computations does not lead to a drastic drop in PSNR, as seen with the use of N-step search. Rather, the PSNR from the above described method is maintained close to that obtained from the FSBM algorithm.

What is claimed is:

1. A method for reducing computations required for compressing motion video frame sequences using multi-resolution level mean pyramid averaging and while dynamically adjusting a number of candidate motion vectors (CMVs) propagated to higher resolution levels to maintain at least a predetermined picture quality, the method comprising:

establishing a relationship between quantized values of frequency contents of reference macroblocks in the video frames against distortion levels resulting from the mean pyramid averaging;

determining the frequency contents of each macroblock;

predicting a distortion value resulting from mean pyramid generation over the frequency contents using the relationship;

generating a limiting mean absolute difference (MAD) value for maintaining picture quality using the predicted distortion value; and propagating any CMVs having a MAD value below the limiting MAD value.

2. The method of claim 1 wherein establishing the relationship comprises establishing the relationship using a training sequence of video frames.

3. The method of claim 2 further comprising:
  determining a frame average MAD variation (FAMV) over the training sequence; and
  re-triggering the training sequence whenever the FAMV exceeds a predetermined threshold value over a plurality of frames.

4. The method of claim 3 wherein determining the FAMV comprises calculating a difference between a frame average MAD (FAM) value for the current frame and a delayed-N-frame average MAD value (DNFAM) for the previous N frames, wherein FAM is an average of the averaged MAD values for all the reference macroblocks in a frame, and DNFAM is an average of the FAM values for the previous N frames.

5. The method of claim 2 wherein establishing the relationship using the training sequence of video frames comprises:
  generating mean pyramids on the reference macroblocks and on the corresponding search area at each resolution level;
  generating deviation pyramids for the reference macroblocks by computing a mean deviation of each pixel at a given level based upon the mean pyramids from corresponding pixels at a level lower thereto; and
  determining an average deviation estimate (ADE) at each resolution level by averaging the deviation pyramid values at that level.

6. The method of claim 5 further comprising:
  quantizing the ADE value to determine a quantized ADE (QADE) for a reference block corresponding thereto;
  determining a corresponding MAD for all search positions at a lowest resolution level;
  propagating a maximum allowed number of CMVs corresponding to at least one lowest determined MAD value to a next higher resolution level;
  determining MAD values at search positions adjacent the CMV positions from lower resolution levels;
  identifying search positions in each level that correspond to the at least one MAD at a highest resolution level as the final motion vector position for that level and the corresponding MAD value as a corresponding MAD value for that level;
  determining distortion values as the difference between the corresponding MAD values and minimum MAD values at each level; and
  saving distortion values from each level over all training frames corresponding to each QADE value in a look-up table.

7. The method of claim 6 wherein quantizing the ADE value to determine the QADE comprises quantizing an average of the mean deviation of the mean pyramid values from the original pixel values over the reference macroblock.

8. The method of claim 1 wherein determining the frequency contents comprises determining a quantized average deviation estimate (QADE) for each macroblock in a video frame.

9. The method of claim 8 wherein predicting the distortion level comprises extracting an estimated distortion value corresponding to the frequency contents using the relationship.

10. The method of claim 9 wherein the estimated distortion value is obtained from a look-up table that matches QADE values to predicted distortion values.

11. The method of claim 1 wherein the limiting MAD for each level is equal to a minimum MAD of the level incremented by the predicted distortion value.

12. A method for reducing computations required for compressing motion video frame sequences using multi-resolution level mean pyramid averaging and while dynamically adjusting a number of candidate motion vectors (CMVs) propagated to higher resolution levels to maintain at least a predetermined picture quality, the method comprising:
  establishing a relationship between quantized values of frequency contents of reference macroblocks in the video frames against distortion levels resulting from the mean pyramid averaging using a training sequence of video frames;
  determining the frequency contents of each macroblock by determining a quantized average deviation estimate (QADE) for each macroblock in a video frame;
  predicting a distortion value resulting from mean pyramid generation over the frequency contents using the relationship;
  generating a limiting mean absolute difference (MAD) value for maintaining picture quality using the predicted distortion value; and
  propagating any CMVs having a MAD value below the limiting MAD value.

13. The method of claim 12 further comprising:
  determining a frame average MAD variation (FAMV) over the training sequence; and
  re-triggering the training sequence whenever the FAMV exceeds a predetermined threshold value over a plurality of frames.

14. The method of claim 13 wherein determining the FAMV comprises calculating a difference between a frame average MAD (FAM) value for the current frame and a delayed-N-frame average MAD value (DNFAM) for the previous N frames, wherein FAM is an average of the averaged MAD values for all the reference macroblocks in a frame, and DNFAM is an average of the FAM values for the previous N frames.

15. The method of claim 12 wherein establishing the relationship using the training sequence of video frames comprises:
  generating mean pyramids on the reference macroblocks and on the corresponding search area at each resolution level;
  generating deviation pyramids for the reference macroblocks by computing a mean deviation of each pixel at a given level based upon the mean pyramids from corresponding pixels at a level lower thereto; and
  determining an average deviation estimate (ADE) at each resolution level by averaging the deviation pyramid values at that level.

16. The method of claim 12 wherein predicting the distortion level comprises extracting an estimated distortion value corresponding to the frequency contents using the relationship.

17. The method of claim 16 wherein the estimated distortion value is obtained from a look-up table that matches QADE values to predicted distortion values.

18. A system for reducing computations required for compressing motion video frame sequences using multi-resolution level mean pyramid averaging and while dynamically adjusting a number of candidate motion vectors (CMVs) propagated to higher resolution levels to maintain at least a predetermined picture quality, the system comprising:
  means for establishing a relationship between quantized values of frequency contents of reference macroblocks in the video frames against distortion levels resulting from the mean pyramid averaging;

means for determining the frequency contents of each macroblock;

means for predicting a distortion value resulting from mean pyramid generation over the frequency contents using the relationship;

means for generating a limiting mean absolute difference (MAD) value for maintaining picture quality using the predicted distortion value; and means for propagating any CMVs having a MAD value below the limiting MAD value.

19. The system of claim 18 wherein said means for establishing the relationship establishes the relationship using a training sequence of video frames.

20. The system of claim 19 further comprising:

means for determining a frame average MAD variation (FAMV) over the training sequence; and means for re-triggering the training sequence whenever the FAMV exceeds a predetermined threshold value over a plurality of frames.

21. The system of claim 19 wherein said means for establishing the relationship:

generates mean pyramids on the reference macroblocks and on the corresponding search area at each resolution level;

generates deviation pyramids for the reference macroblocks by computing a mean deviation of each pixel at a given level based upon the mean pyramids from corresponding pixels at a level lower thereto; and determines an average deviation estimate (ADE) at each resolution level by averaging the deviation pyramid values at that level.

22. The system of claim 18 wherein said means for determining the frequency contents determines a quantized average deviation estimate (QADE) for each macroblock in a video frame.

23. The system of claim 18 wherein predicting the distortion level comprises extracting an estimated distortion value corresponding to the frequency contents using the relationship.

24. A system for reducing computations required for compressing motion video frame sequences using multi-resolution level mean pyramid averaging and while dynamically adjusting a number of candidate motion vectors (CMVs) propagated to higher resolution levels to maintain at least a predetermined picture quality, the system comprising:

a quantized average deviation estimator for establishing a relationship between quantized values of frequency contents of reference macroblocks in the video frames against distortion levels resulting from the mean pyramid averaging;

a detector for determining the frequency contents of each macroblock;

a distortion band estimator for predicting a distortion value resulting from mean pyramid generation over the frequency contents using the relationship; and a distortion band predictor for generating a limiting mean absolute difference (MAD) value using the predicted distortion value, the limiting MAD for use in maintaining picture quality by propagating any CMVs having a MAD value below the limiting MAD value.

25. The system of claim 24 wherein said quantized average deviation estimator establishes the relationship using a training sequence of video frames.

26. A computer readable medium for a computer for compressing motion video frame sequences using multi-resolution level mean pyramid averaging and while dynamically adjusting a number of candidate motion vectors (CMVs) propagated to higher resolution levels to maintain at least a predetermined picture quality, the computer readable medium having computer-executable instructions for causing the computer to perform steps comprising:

establishing a relationship between quantized values of frequency contents of reference macroblocks in the video frames against distortion levels resulting from the mean pyramid averaging;

determining the frequency contents of each macroblock;

predicting a distortion value resulting from mean pyramid generation over the frequency contents using the relationship;

generating a limiting mean absolute difference (MAD) value for maintaining picture quality using the predicted distortion value; and propagating any CMVs having a MAD value below the limiting MAD value.

27. The computer-readable medium of claim 26 wherein the step of establishing the relationship comprises establishing the relationship using a training sequence of video frames.

28. The computer-readable medium of claim 27 further having computer-executable instructions for causing the computer to perform steps comprising:

determining a frame average MAD variation (FAMV) over the training sequence; and re-triggering the training sequence whenever the FAMV exceeds a predetermined threshold value over a plurality of frames.

29. The computer-readable medium of claim 26 wherein the step of determining the frequency contents comprises determining a quantized average deviation estimate (QADE) for each macroblock in a video frame.

30. The computer-readable medium of claim 29 wherein the step of predicting the distortion level comprises extracting an estimated distortion value corresponding to the frequency contents using the relationship.

31. The computer-readable medium of claim 30 wherein the estimated distortion value is obtained from a look-up table that matches QADE values to predicted distortion values.

* * * * *